US009021151B2

(12) United States Patent
Yagi

(10) Patent No.: US 9,021,151 B2
(45) Date of Patent: Apr. 28, 2015

(54) CIRCUIT AND METHOD OF CONTROL OF DDC DATA TRANSMISSION FOR VIDEO DISPLAY DEVICE

(75) Inventor: Masaya Yagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/530,300

(22) PCT Filed: Apr. 24, 2008

(86) PCT No.: PCT/JP2008/058316
§ 371 (c)(1), (2), (4) Date: Sep. 8, 2009

(87) PCT Pub. No.: WO2008/139944
PCT Pub. Date: Nov. 20, 2008

(65) Prior Publication Data

US 2010/0103272 A1 Apr. 29, 2010

(30) Foreign Application Priority Data

May 2, 2007 (JP) ................................ 2007-121837

(51) Int. Cl.
*G06F 3/00* (2006.01)
*G09G 5/00* (2006.01)

(52) U.S. Cl.
CPC ............ *G09G 5/006* (2013.01); *G09G 2330/08* (2013.01); *G09G 2370/047* (2013.01)

(58) Field of Classification Search
None
See application file for complete search history.

(56) References Cited

U.S. PATENT DOCUMENTS

| | | | | |
|---|---|---|---|---|
| 5,276,458 | A | 1/1994 | Sawdon | 345/123 |
| 5,943,029 | A * | 8/1999 | Ross | 345/11 |
| 6,618,773 | B1 * | 9/2003 | Chang et al. | 710/16 |
| 7,079,129 | B2 * | 7/2006 | Shigeta | 345/213 |
| 7,176,980 | B2 * | 2/2007 | Stone et al. | 348/558 |
| 7,539,808 | B2 | 5/2009 | Kojima | 710/302 |
| 7,729,874 | B2 * | 6/2010 | Keady et al. | 702/89 |
| 7,761,709 | B2 * | 7/2010 | Choi | 713/168 |
| 7,827,319 | B2 * | 11/2010 | Kimura et al. | 710/5 |
| 7,856,520 | B2 * | 12/2010 | Ranade et al. | 710/106 |
| 7,860,398 | B2 * | 12/2010 | Tatum et al. | 398/141 |
| 7,873,980 | B2 * | 1/2011 | Horan et al. | 725/128 |

(Continued)

FOREIGN PATENT DOCUMENTS

| | | |
|---|---|---|
| JP | 7-302068 | 11/1995 |
| JP | 2006-309404 | 11/2006 |

OTHER PUBLICATIONS

Digital Visual Interface, Digital Display Working Group, Revision 1.0 (XP-002907715), pp. 1-76 (Apr. 2, 1999).

(Continued)

*Primary Examiner* — Henry Tsai
*Assistant Examiner* — Christopher Bartels
(74) *Attorney, Agent, or Firm* — Fitzpatrick, Cella, Harper & Scinto

(57) ABSTRACT

A video processing device includes a connecting unit that is connected to an external apparatus via an interface including a HPD line and a DDC line, a memory that stores EDID, with the EDID being transmitted via the DDC line; and a control unit that performs a predetermined process for resetting a state of the HPD line if a predetermined error relating to a transmission of EDID is detected. The control unit changes a state of the video processing device to a power off state if a number of times that the predetermined process is performed is not less than a predetermined value.

25 Claims, 4 Drawing Sheets

(56) References Cited

U.S. PATENT DOCUMENTS

| | | | | |
|---|---|---|---|---|
| 7,889,201 | B2 * | 2/2011 | Yato | 345/501 |
| 7,979,590 | B2 * | 7/2011 | Lida et al. | 710/2 |
| 7,979,910 | B2 * | 7/2011 | Mantani | 726/26 |
| 7,995,043 | B2 * | 8/2011 | Noorbakhsh et al. | 345/204 |
| 8,266,335 | B2 * | 9/2012 | Kitano et al. | 710/15 |
| 8,447,158 | B2 * | 5/2013 | Yamamoto | 386/200 |
| 8,453,008 | B2 * | 5/2013 | Kimoto | 714/4.1 |
| 8,510,483 | B2 * | 8/2013 | Kawai | 710/33 |
| 2002/0060676 | A1 * | 5/2002 | Kim | 345/212 |
| 2004/0027515 | A1 * | 2/2004 | Itakura | 349/110 |
| 2004/0125886 | A1 * | 7/2004 | Berard | 375/296 |
| 2004/0143847 | A1 * | 7/2004 | Suzuki et al. | 725/61 |
| 2005/0116884 | A1 | 6/2005 | Kim et al. | 345/11 |
| 2005/0141851 | A1 * | 6/2005 | Nakayama et al. | 386/46 |
| 2005/0182876 | A1 * | 8/2005 | Kim et al. | 710/100 |
| 2005/0225547 | A1 * | 10/2005 | Choi | 345/211 |
| 2005/0228995 | A1 * | 10/2005 | Kwak et al. | 713/168 |
| 2006/0092152 | A1 * | 5/2006 | Jang et al. | 345/211 |
| 2006/0206734 | A1 * | 9/2006 | Hori | 713/300 |
| 2006/0280055 | A1 * | 12/2006 | Miller et al. | 369/44.11 |
| 2007/0036158 | A1 * | 2/2007 | Hun-Kwon et al. | 370/389 |
| 2007/0047638 | A1 * | 3/2007 | Lam et al. | 375/239 |
| 2007/0055876 | A1 * | 3/2007 | Choi | 713/170 |
| 2007/0070402 | A1 * | 3/2007 | Kitayama et al. | 358/1.15 |
| 2007/0165997 | A1 * | 7/2007 | Suzuki et al. | 386/46 |
| 2007/0186015 | A1 * | 8/2007 | Taft et al. | 710/16 |
| 2007/0220150 | A1 * | 9/2007 | Garg | 709/226 |
| 2007/0222779 | A1 * | 9/2007 | Fastert et al. | 345/418 |
| 2007/0236605 | A1 * | 10/2007 | Saito et al. | 348/512 |
| 2007/0242062 | A1 * | 10/2007 | Guo et al. | 345/204 |
| 2007/0280646 | A1 * | 12/2007 | Seita et al. | 386/96 |
| 2007/0283071 | A1 * | 12/2007 | Konishi | 710/302 |
| 2008/0074622 | A1 * | 3/2008 | Jayaram et al. | 353/49 |
| 2008/0134237 | A1 * | 6/2008 | Tu et al. | 725/38 |
| 2008/0152023 | A1 * | 6/2008 | Yoshida et al. | 375/257 |
| 2009/0177818 | A1 * | 7/2009 | Shim et al. | 710/100 |
| 2009/0178086 | A1 * | 7/2009 | Unger | 725/81 |
| 2010/0283894 | A1 * | 11/2010 | Horan et al. | 348/441 |

OTHER PUBLICATIONS

High-Definition Multimedia Interface, Specification Version 1.3a (XP-002491706), pp. 11 and 50-52 (Nov. 10, 2006).

Notification of Transmittal of the International Search Report and the Written Opinion dated Aug. 29, 2008, in PCT/JP2008/058316.

Notification of Transmittal of International Preliminary Report on Patentability dated Feb. 26, 2009, in PCT/JP2008/058316.

* cited by examiner

CIRCUIT AND METHOD OF CONTROL OF DDC DATA TRANSMISSION FOR VIDEO DISPLAY DEVICE

TECHNICAL FIELD

The present invention relates to a video display device and a control method therefor, and more particularly, to a video display device with an interface capable of bidirectional communication with a video output device such as a computer or a DVD (digital video disc) player, and a control method for the video display device.

BACKGROUND ART

In recent years, standards for interconnecting electronic devices have been established. For example, as a standard that enables usage just by connecting a peripheral device to a computer (hereinafter "PC"), PnP (Plug and Play) is known.

By connecting a video display device and a PC, both of which support such a standard, a standard display characteristics can be obtained without a user having to install a driver software or make color adjustments. A video display device of this sort is described in Japanese Patent Application Laid-Open No. 07-302068-A (D1).

In D1, a communication line for communications between the PC and the video display device is provided, and through the communication line the PC reads identification information and timing information of the video display device, generates and outputs video having appropriate signal timings or in an appropriate signal format to the video display device.

DDC (Display Data Channel), issued by VESA (Video Electronics Standards Association), is a communication standard for communication between a video display device and a video output device. DDC is employed, for example, in such display interface standards as HDMI (High-Definition Multimedia. Interface) and DVI (Digital Visual Interface).

Video output devices that support DDC version 2 (DDC2) or higher, which supports bidirectional communication, once connection of a video display device has been detected by a connect detection signal, output a clock signal (up to 100 kHz) to the clock line (SCL line) used in DDC. Then, the video output device transmits an EDID (Extended Display Identification Data) transmission request command to the video display device. EDID is video display device attribute information, and it includes product information such as model name and manufacturer name as well as information relating to display capability (such as displayable resolution, vertical sync frequency combinations, and so forth) and characteristics (such as gamma values). Once the EDID transmission request command is transmitted to it from the video output device, the video display device immediately sends back the EDID in synchronization with the SCL line clock. The video output device then receives the EDID transmitted from the video display device and ascertains the video display device configuration, which it reflects in a process of generating the video that is output thereafter.

The connect detection signal is detected by the video output device by mechanical and electrical connection through an interface cable of the respective interface connectors of the video output device and the video display device.

Then, once the video output device detects the connect detection signal, communication with the video display device from clock output, the EDID transmission request command transmission and up to EDID reception is performed automatically. Although this automatic process makes it possible to use the video display device without the user having to perform special settings, conversely, it might be a problem that once the connect detection signal is detected, communications between the devices after that cannot be stopped.

For example, to conduct communications using DDC2, it is necessary to make sure that all the signal lines, including SDA (I2C), SCL (I2C), VCLCK, DDC5V, HPD (Hot Plug Detect), GND, and so on are connected correctly. However, because it is handled by the user, the connection between the interface connector on the device side and the interface connector provided at the end of the interface cable is not always connected correctly.

Thus, for example, in a case in which the interface cable connector is inserted at an angle to the device-side connector, even though the connect detection signal (HPD) pin might be in a connected state, the connections for the other pins, such as the SCL and SDA signal pins, may be incomplete.

If in such a state communication involving transmission of an EDID transmission request command or the like is started automatically, the video output device cannot correctly receive the EDID. In that case, despite the fact that the video display device is connected, the video output device might decide that the EDID contents cannot be read, and as a result stop video output.

DISCLOSURE OF INVENTION

The present invention is conceived as a solution to the problem of the conventional art described above, and provides a video display device capable of transmitting attribute information more securely to a video output device capable of bidirectional communication, and a control method for the video display device.

According to an aspect of the present invention, there is provided a video display device for displaying a video signal from a video output device, comprising: memory means arranged to store attribute information including information relating to display capability; interface means arranged to include a bidirectional communication line with the video output device and a connect detection line to allow the video output device to detect connection with the video display device; monitoring means arranged to monitor a state of the bidirectional communication line and to determine whether transmission of the attribute information in response to an attribute information read request from the video output device is completed normally; and reset means arranged to control a state of the connect detection line of the interface means to be a disconnected state temporarily and then resumes to a connected state if the monitoring means determines that the attribute information transmission is not completed normally.

According to another aspect of the present invention, there is provided a control method for a video display device for displaying a video signal from a video output device, the video display device having memory means to store attribute information including information relating to display capability and interface means including a bidirectional communication line with the video output device and a connect detection line to allow the video output device to detect connection with the video display device, the control method comprising: a monitoring step of monitoring a state of the bidirectional communication line and determining whether transmission of the attribute information in response to an attribute information read request from the video output device is completed normally; and a reset step of controlling a state of the connect detection line of the interface means to be a disconnected state temporarily and then resumes to a connected state if in the monitoring step it is determined that transmission of the attribute information is not completed normally.

Further features of the present invention will become apparent from the following description of exemplary embodiments with reference to the attached drawings.

BEST MODE FOR CARRYING OUT THE INVENTION

Preferred embodiments of the present invention will now be described in detail in accordance with the accompanying drawings.

First Embodiment

Figure 1:
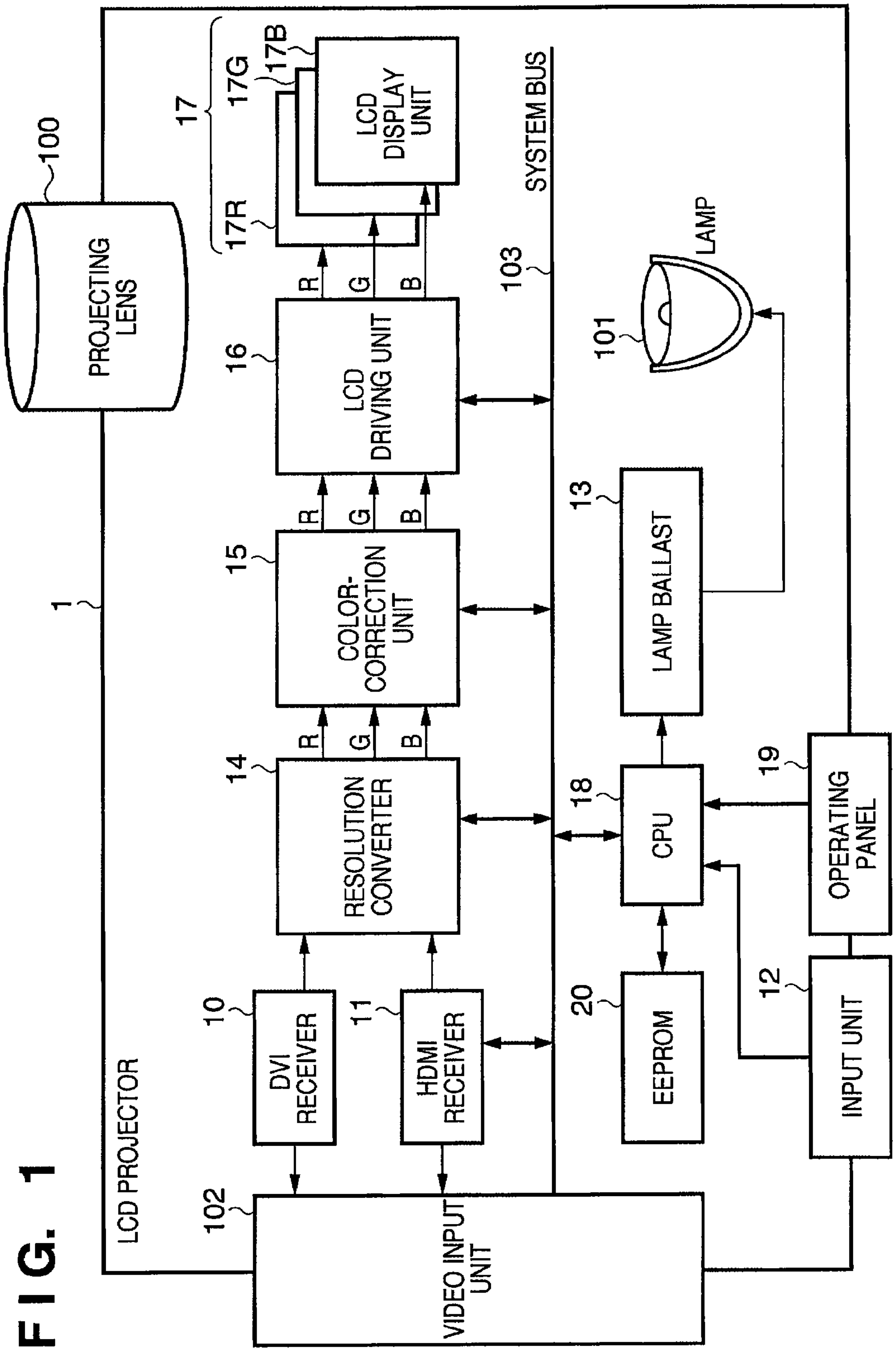
FIG. 1 is a block diagram illustrating a functional configuration example of a LCD projector as one example of a video display device according to a first embodiment of the present invention.

FIG. 1 is a block diagram illustrating a functional configuration example of an LCD (liquid crystal display) projector as one example of a video display device according to a first embodiment of the present invention.

In the LCD projector shown in FIG. 1, a video input unit 102 is provided with at least one interface that supports bidirectional communication with an external apparatus (a video output device). Here, the video input unit 102 is provided with two such interfaces, DVI and HDMI. In addition, although the bidirectional communication with the external apparatus is performed based on DDC version 2 (DDC2) standard or higher, alternatively such communication may be based on another standard.

The video input unit 102 outputs a video signal input from the external apparatus to that interface of either a DVI receiver 10 or a HDMI receiver 11 to which the external apparatus is connected.

The DVI receiver 10 and the HDMI receiver 11 converts the video signal supplied from the video input unit 102 in TMDS (Transition Minimized Differential Signaling) format into a signal format suitable for processing by a resolution converter 14.

The resolution converter 14 applies resolution conversion processes such as a picture quality correction and a scaling to the video signal, and outputs the processed video signal to a color-correction unit 15.

The color-correction unit 15 performs V-T (transmittance-voltage) correction and the like adapted to the structure of the optical system and the structure of the LCD panel on the resolution-converted video signal, and outputs the corrected video signal to a LCD driving unit 16.

At the LCD driving unit 16, a LCD driving circuit, not shown, drives three LCD display units 17R, 17G, and 17B corresponding to the color components (R, G, and B) of the video signal.

Light from a lamp 101 strikes these three LCD display units 17R, 17G, and 17B, and a transmissive image or a reflected image is directed to a projecting lens 100. The projecting lens 100 projects the incoming image.

An input unit 12 is a command data input interface such as a RS-232C, USB (Universal Serial Bus) or the like. The input unit 12 includes an interface driver, not shown, and is connected to a CPU 18. An EEPROM (electrically erasable programmable read only memory) 20 stores LCD projector 1 cumulative operating time, cumulative lamp lit time, and cumulative operating time thresholds for issuing a warning and the like as well as other initial operating values.

The CPU 18 controls the overall operation of the LCD projector 1 by executing a control program stored in a ROM (read only memory), not shown. In addition, the CPU 18 measures a time from the start of operation of the LCD projector 1 to the end of operation, and updates information relating to cumulative operating time in the EEPROM 20.

An operating panel 19 contains keys and buttons to enable a user to input various instructions to the LCD projector 1. Manipulations of the operating panel 19 by the user are input to the CPU 18, and the CPU 18 performs processing, such as OSD (on-screen display) control, according to the content of the input.

A lamp ballast 13 is a stabilizer for the lamp 101, and in accordance with the control exerted by the CPU 18 adjusts according to control of the lamp 101, changes over time in electrical power supplied to the lamp while it is lit during operation, average luminance of the image, and so forth.

A system bus 103 communicably connects the video input unit 102, the DVI receiver 10, the HDMI receiver 11, the resolution converter 14, the color-correction unit 15, the LCD driving unit 16, and the CPU 18.

Figure 2:
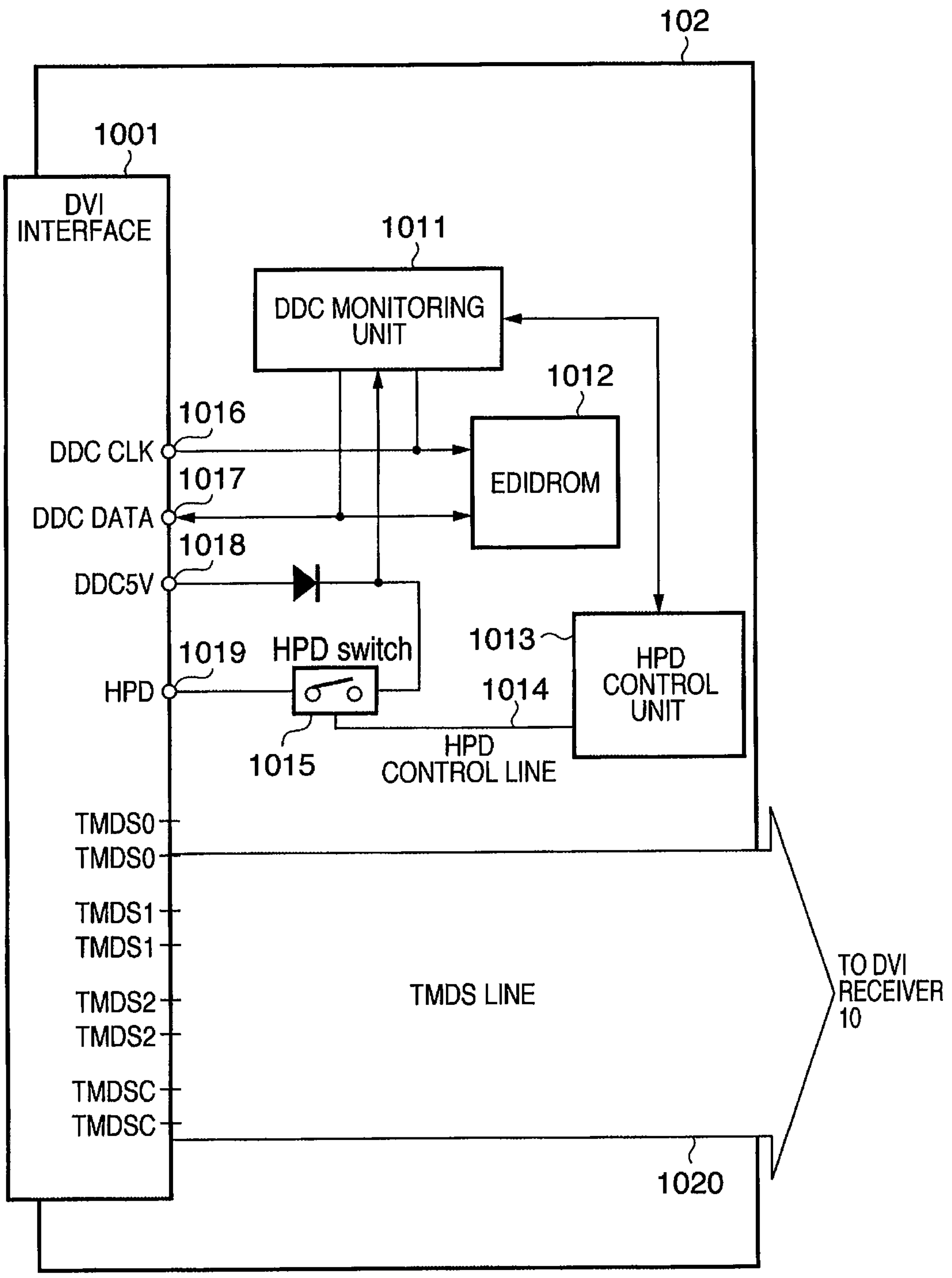
FIG. 2 is a diagram illustrating a configuration example of essential parts of a video input unit 102 shown in FIG. 1.

FIG. 2 is a diagram showing an example configuration of essential parts of the video input unit 102 shown in FIG. 1.

To facilitate description and understanding, a description is given only of the DVI interface among all the various interfaces that the video input unit 102 has. However, it should be noted that the same configuration is applicable to the HDMI interface described later.

A video output device is connected to a DVI connector 1001 by a cable, not shown. A DDC monitoring unit 1011 monitors the state of a power line (DDC5V) 1018 of the connector 1001 as well as a DDC bus line (clock line (DDC CLK) 1016) and data line (DDC DATA) 1017). The DDC bus line is a bidirectional communication line to the video output device. The DDC monitoring unit 1011 reports monitoring results and the like to the CPU 18 through the system bus 103.

EDID ROM 1012 is an EEPROM that stores LCD projector 1 attribute information EDID.

A HPD switch 1015 turns a connection between the DVI connector 1001 power line (DDC5V) 1018 and a connect detection line (HPD) 1019 on and off in accordance with control exerted by an HPD control unit 1013.

Through an HPD control line 1014, the HPD control unit 1013 turns the HPD switch 1015 on and off according to the monitoring results from the DDC monitoring unit 1011. When the LCD projector 1 is activated, the HPD control unit 1013 puts the HPD switch 1015 into an ON (closed) state through the HPD control line 1014.

As described above, the DDC monitoring unit 1011 of the present embodiment monitors the state of the DDC5V 1018 in DVI connector 1001 (which, in a case in which the HPD switch 1015 is closed, can also be considered to be the state of the connect detection line 1019) and also monitors the DDC bus line. Monitoring of the DDC bus line can be started at any time. However, in actuality, unless the DDC5V 1018 reaches or exceeds a predetermined voltage (that is, unless an external apparatus is connected), DDC communication is not started. Therefore, monitoring may start when it is detected that the DDC5V has reached a certain voltage. Alternatively, the DDC bus line alone may be monitored, without monitoring the DDC5V.

The DDC bus line is based on a bus standard and is composed of two communication paths, the serial transmission clock line DDC CLK 1016 and the serial data line DDC DATA 1017. It should be noted that, in the HDMI standard, the clock line is called SCL and the data line is called SDA, even though they are signal lines just like DDC CLK and DDC DATA. Therefore, the same procedure as is described below is applicable to the HDMI interface as well simply by substituting SCL for DDC CLK and SDA for DDC DATA in the following.

In the I2C bus standard, a device that supplies a clock to the clock line functions as a master and all other devices function as slaves. The master writes to and reads from the slaves. As is described later, in the present embodiment, the video output device functions as the master because it supplies the CLOCK, such that, by reading out the contents of the slave LCD projector 1 EDID ROM 1012, the video output device acquires EDID.

Both master and slave drives the DDC CLK 1016 and the DDC DATA 1017 in an open drain state. In a case in which the master and the slave both become un-driven, a pull-up resistance value is provided so that the logic level becomes H (high).

In a case in which the master specifies to the slave a write or a read address and the slave side generates an acknowledge, if a normal acknowledge is not issued from the slave side there is no movement to the next write or read state.

The DDC monitoring unit 1011 checks the contents of the acknowledge and the transmission data, and detects that a connection to the video output device has been established when it ascertains that a normal acknowledge has been issued for the first read request from the master video output device and that there is nothing wrong with the transmission data.

In contrast, in the event that a problem with the transmission is detected, either because a normal acknowledge is not issued or because there is something wrong with the transmission data, such error detection is reported from the DDC monitoring unit 1011 to the HPD control unit 1013. In response to such notification, the HPD, control unit 1013, through the HPD control line 1014, puts the HPD switch 1015 into an OFF (open) state, temporarily disconnecting the DDC5V 1018 and the HPD 1019. Subsequently, after a certain period of time, the HPD control unit 1013 once again puts the HPD switch 1015 into an ON state.

The opening and closing of the HPD switch 1015 is detected by the external apparatus as a change in the electric potential of the connect detection line HPD 1019 (0 to 5 V). This change is the same change in electric potential as that when a display device is once disconnected and then reconnected.

Therefore, the master external apparatus performs DDC communication once again from the beginning, and issues a new EDID transmission request (a request to read out EDID inside the EDID ROM 1012). In response thereto, the LCD projector 1 transfers the EDID.

Thus, as described above, in a case in which connector connection is incomplete or the like and EDID communication has not been performed normally, by providing to the external apparatus a state in which the LCD projector 1 is once disconnected and then reconnected, EDID is securely transferred to the external apparatus.

Figure 3:
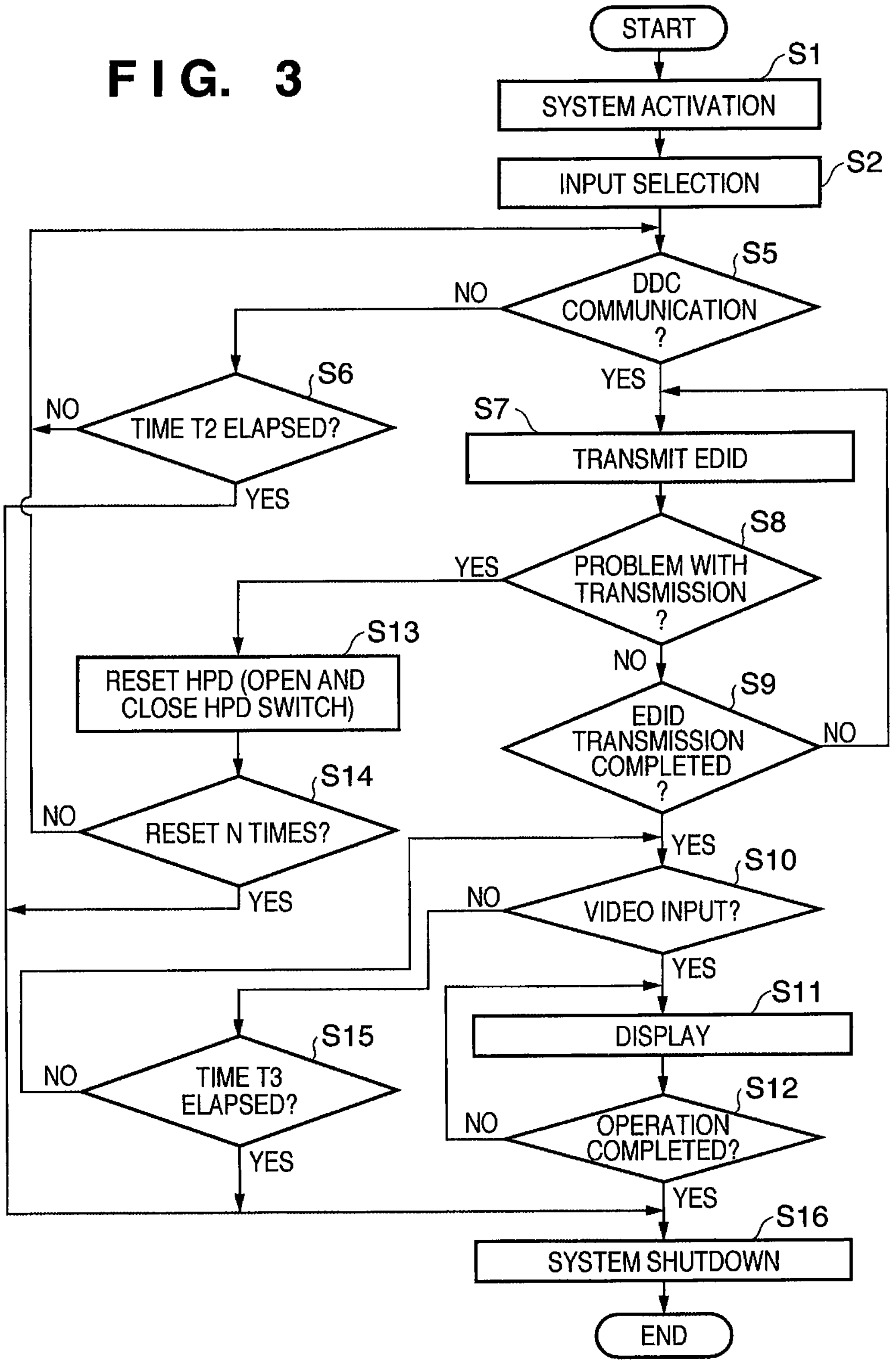
FIG. 3 is a flow chart illustrating operation of the LCD projector according to the first embodiment of the present invention.

A description of this series of operations is given again, using the flow chart shown in FIG. 3.

First, by pressing a power button or the like included in the operating panel 19, the LCD projector 1 is activated (S1), causing the CPU 18 to execute operations to initialize the apparatus.

Next, in S2, assume that signal input from an interface that supports DDC is selected. Specifically, of the plurality of interfaces that the video input unit 102 has, the CPU 18 detects, for example, that an instruction to select input from the DVI interface, for example, has been provided through the operating panel 19.

In S5, the DDC monitoring unit 1011, based on the states of the DDC CLK 1016 and the DDC DATA 1017, determines whether or not DDC communication has started. This determination may be made, for example, by observing a cyclical change in electric potential of the DDC CLK 1016 brought about by the start of supply of a clock from the external apparatus (the video output device). Alternatively, the start of DDC communication can be determined by observing a change in the electric potential of the DDC DATA 1017.

These determinations take advantage of the fact that, when DDC communication is not being performed, no change is seen in the electric potential of the DDC CLK 1016 or the DDC DATA 1017. It should be noted that the start of DDC communication may also be determined by other methods.

In S6, the DDC monitoring unit 1011 determines if a predetermined period of time T2 has elapsed since input selection. If not, then processing returns to S5 and the DDC monitoring unit 1011 once again determines whether or not DDC communication has started. If the period of time T2 has elapsed and the DDC monitoring unit 1011 determines that DDC communication has still not started, then the DDC monitoring unit 1011 notifies the CPU 18 through the system bus 103.

The CPU 18, having been notified by the DDC monitoring unit 1011, performs a system end process (shutdown process) (S16), because keeping the lamp 101 in a lit state even though no video is being displayed is not desirable either in terms of power consumption or in terms of extending the life of the apparatus (particularly the lamp 101).

In a case in which it is determined in S5 that DDC communication has started, in S7 EDID is transferred from the EDID ROM 1012. In actuality, EDID in the EDID ROM 1012 is read and output to the video output device by a read request from the master video output device.

During EDID transfer, the DDC monitoring unit 1011 monitors the DDC CLK 1016 and the DDC DATA 1017 and checks whether or not there is a problem with the EDID transmission (S8, S9).

Specifically, the DDC monitoring unit 1011 determines that there is a problem in the event that any of the following is detected:

- a normal acknowledge is not issued;
- the pattern of change in electric potential of the DDC CLK or the DDC DATA is different from the expected pattern; and
- the electric potentials of the lines become abnormal.

In the event that a problem with the EDID transmission is detected, the DDC monitoring unit 1011 notifies the HPD control unit 1013. The HPD control unit 1013, having been so notified, switches the HPD switch OFF (open) via the HPD control line 1014, disconnecting the DDC5V 1018 and the HPD 1019. Then, the HPD control unit 1013 once again switches the HPD switch 10150N after a certain period of time has elapsed. This operation of opening and closing the HPD switch 1015 is called a reset. Preferably, the time the HPD switch is off is toward the short end of a range within which the external apparatus, based on the electric potential of the HPD line, can detect that the LCD projector 1 has been disconnected (that is, the connection has been broken).

Execution of the HPD reset process is reported from the HPD control unit 1013 to the DDC monitoring unit 1011. In S14, the DDC monitoring unit 1011 determines whether or not a number of times the HPD reset process has been performed since activation has reached a predetermined number N (where N is an integer equal to or greater than 2).

In the event that the number of times the reset process has been performed has reached N, as in S6 the DDC monitoring unit 1011 notifies the CPU 18 and the CPU performs the shutdown process (S16).

In contrast, if the number of times the reset process has been performed is less than N, processing returns to S5. This is because, if the video output device correctly detects changes in the electric potential of the HPD line due to the reset process, then DDC communication should have restarted.

When in S9 EDID transmission is completed without a problem being detected, the DDC monitoring unit 1011 notifies the CPU 18 via the system bus 103.

The CPU, having been so notified, monitors if a video signal has been input to the DVI receiver 10 (S10). Then, if a predetermined period of time T3 since reception of notification of the end of EDID transmission elapses and input of a video signal still cannot be confirmed, the CPU 18 performs the shutdown process.

In contrast, in a case in which input of a video signal can be confirmed before the period of time T3 elapses, the CPU 18 controls the resolution converter 14, the color-correction unit 15, the LCD driving unit 16, the LCD display unit 17, and the lamp ballast 13, and displays (projects) the video signal.

Thereafter, when the end of operation is specified, for example, by input of a power cutoff instruction from the operating unit 19 (S12), the CPU performs the shutdown operation (S16).

Thus, the present embodiment monitors the state of the bidirectional communication line to the video output device, and, in the event that it is determined that the transmission of attribute information has not been performed normally, temporarily puts the signal line for performing connect detection in a disconnected state, after which it returns the signal line for performing connect detection to a connected state once again, making it possible to cause the video output device to reissue an attribute information read request. As a result, even in a case in which the first read request failed to be responded to correctly, such as when the signal line for performing connect detection is connected before the signal line used for transmission of attribute information, attribute information is transmitted correctly in response to the reissued read request. Therefore, it is possible to greatly reduce the possibility that the video output device might detect a problem with or a disconnect from the video display device because it cannot correctly acquire video display device attribute information, despite the fact that the video display device is in actuality connected.

Second Embodiment

Figure 4:
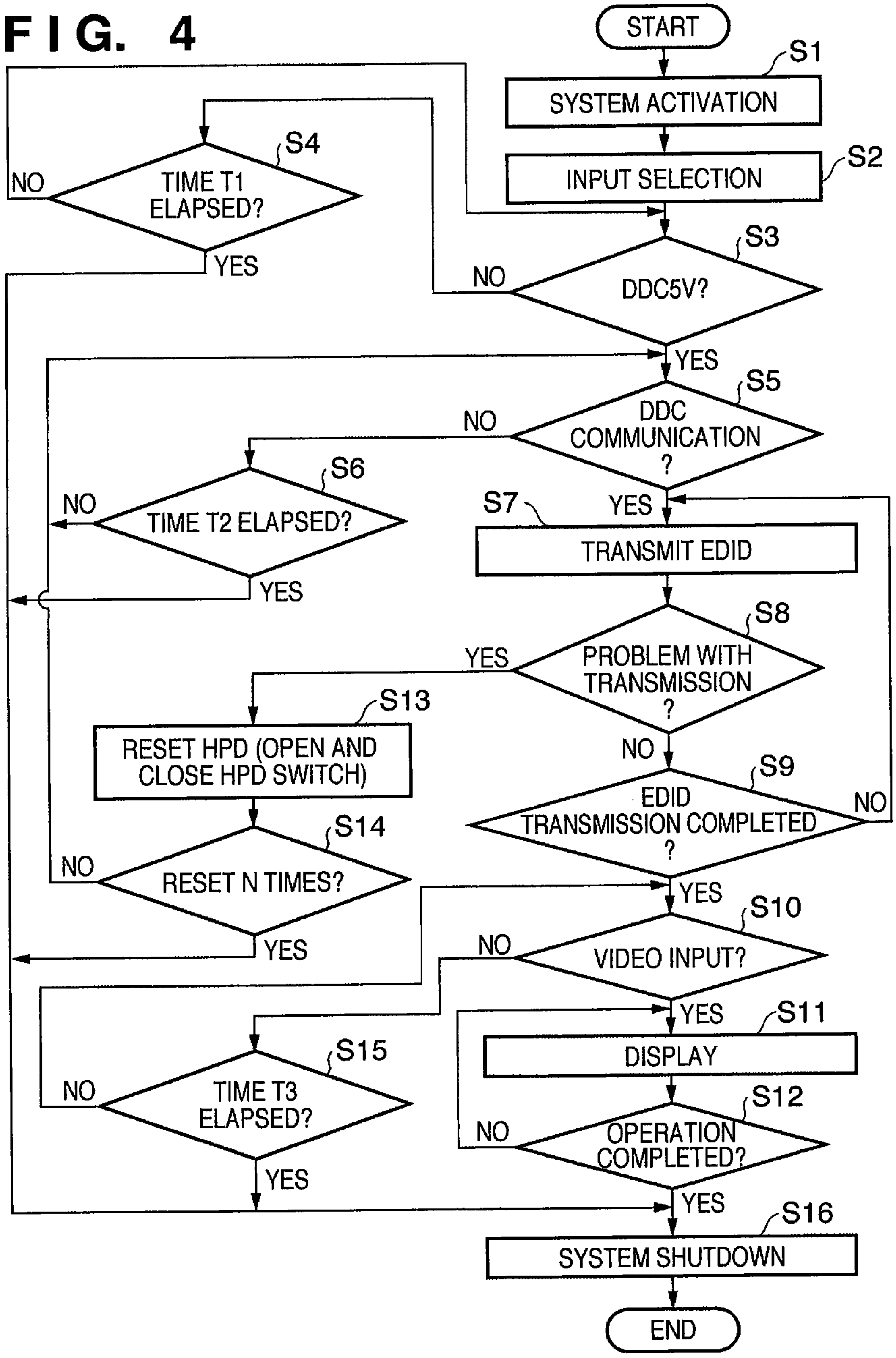
FIG. 4 is a flow chart illustrating operation of the LCD projector according to a second embodiment of the present invention.

FIG. 4 is a flow chart illustrating operation of an LCD projector as one example of a video display device according to a second embodiment of the present invention.

The configuration of the LCD projector of this second embodiment may be identical to that of the first embodiment, and redundant description thereof is therefore omitted. Moreover, in FIG. 4, the same reference numerals are assigned to those steps that are identical to the steps already described with reference to FIG. 3, and redundant description thereof is therefore omitted.

In the present second embodiment, with respect to the processing performed in the first embodiment, steps (S3 and S4) of determining if the power supply line DDC5V 1018 electric potential is detected are added after input selection but before the predetermined period of time T1 elapses.

In the first embodiment, after input selection, the DDC monitoring unit 1011, which is unrelated to the electric potential of the DDC5V, starts monitoring the DDC CLK 1016 and the DDC DATA 1017. However, as described above, in actuality, unless the DDC5V 1018 electric potential reaches or exceeds a certain value, DDC communication is not started. Therefore, in the present embodiment, before starting to monitor the DDC CLK 1016 and the DDC DATA 1017, a simpler process of monitoring the DDC5V 1018 is performed. Accordingly, summarily increasing the connect detection conditions makes it possible to improve connect detection probability and to improve connect detection reliability, enabling the attribute information to be transmitted more securely.

In the event that the DDC5V 1018 electric potential does not reach or exceed a certain value even after the period of time T1 elapses, the DDC monitoring unit 1011 notifies the CPU 18 and the CPU 18 performs the shutdown operation (S16). In the event that the DDC5V 1018 electric potential does reach or exceed a certain value before the period of time T1 elapses, the DDC monitoring unit 1011 in S5 starts to monitor the DDC bus line (the DDC CLK 1016 and the DDC DATA 1017). The remainder of the process is the same as that of the first embodiment, and a description thereof is therefore omitted.

Thus, the second embodiment adds to the effect of the first embodiment an ability to improve connect detection probability and to improve connect detection reliability, which in turn enables the attribute information to be transmitted more securely, by shortening the time to the start of DDC communication start detection and summarily increasing the connect detection conditions.

It should be noted that although the present invention has been described with reference to preferred embodiments, the present invention is not limited to the preferred embodiments described herein, and various variations and modifications are possible within the scope of the present invention.

Other Embodiments

It should be noted that the a computer program for implementing the process steps described above with reference to FIG. 3 and FIG. 4 as software using a system or an apparatus computer (or CPU, MPU or the like) is itself within the scope of the present invention.

It should be noted that a computer program for implementing the embodiments described above may be provided in any form that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD, or DVD, and a non-volatile semiconductor memory or the like.

As for the method of supplying the program using wire/wireless communications, there is, for example, a method that utilizes a server on a network. In this case, a data file (program data file) capable of becoming the computer program that comprises the invention is stored on a server on a computer network.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-121837, filed on May 2, 2007, which is hereby incorporated by reference herein in its entirety.

What is claimed is:

1. A device comprising:

a memory storing extended display identification data (EDID);

a transmitting unit that transmits the EDID from the memory to an external apparatus via a first line;

a detecting unit that detects whether or not an error in the first line occurs after the transmission of the EDID from the memory to the external apparatus via the first line is started and before the transmission of the EDID from the memory to the external apparatus via the first line ends; and a control unit that controls a voltage supplied to the external apparatus via a second line if the detecting unit detects that the error in the first line occurs after the transmission of the EDID from the memory to the external apparatus via the first line is started and before the transmission of the EDID from the memory to the external apparatus via the first line ends, so that the external apparatus can determine that the device is disconnected and then connected.

2. The device according to claim 1, wherein the detecting unit uses an electrical potential relating to the first line to detect whether or not the error in the first line occurs.

3. The device according to claim 1, wherein the detecting unit detects that the error in the first line occurs if a normal acknowledgement about the EDID is not issued from the external apparatus.

4. The device according to claim 1, wherein the external apparatus and the device are connected via a power line, and wherein a process for disconnecting a connection between the power line and the second line is performed by the control unit if the detecting unit detects that the error in the first line occurs after the transmission of the EDID from the memory to the external apparatus via the first line is started and before the transmission of the EDID from the memory to the external apparatus via the first line ends.

5. The device according to claim 1, further comprising a display unit that displays a video signal if the video signal is received from the external apparatus after transmission of the EDID ends and before a predetermined time elapses.

6. The device according to claim 1, wherein the device performs a shutdown process if a video signal is not received from the external apparatus after transmission of the EDID ends and before a predetermined time elapses.

7. The device according to claim 1, wherein the device performs a shutdown process if a process for controlling a voltage supplied to the external apparatus via the second line is performed a predetermined number of times.

8. The device according to claim 1, wherein the device includes a projector.

9. The device according to claim 1, wherein the external apparatus and the device are connected via a power line, wherein the detecting unit detects whether or not an electrical potential relating to the power line exceeds a predetermined value, before the EDID is transmitted from the memory to the external apparatus via the first line, and wherein transmission of the EDID from the memory to the external apparatus via the first line is started if the electrical potential relating to the power line exceeds the predetermined value.

10. The device according to claim 1, wherein the first line corresponds to a display data channel (DDC) line, and the second line corresponds to a hot plug detect (HPD) line.

11. The device according to claim 1, further comprising:

a display unit configured to display an image;

a light source configured to provide a light to the display unit; and a projecting lens configured to project an image.

12. A method for a device, the method comprising:

transmitting extended display identification data (EDID) from a memory to an external apparatus via a first line, wherein the device includes the memory that stores the EDID;

detecting whether or not an error in the first line occurs after the transmission of the EDID from the memory to the external apparatus via the first line is started and before the transmission of the EDID from the memory to the external apparatus via the first line ends; and controlling a voltage supplied to the external apparatus via a second line if an occurrence of the error in the first line is detected after the transmission of the EDID from the memory to the external apparatus via the first line is started and before the transmission of the EDID from the memory to the external apparatus via the first line ends, so that the external apparatus can determine that the device is disconnected and then connected.

13. The method according to claim 12, wherein an electrical potential relating to the first line is used to detect whether or not the error in the first line occurs.

14. The method according to claim 12, wherein an occurrence of the error in the first line is detected if a normal acknowledgement about the EDID is not issued from the external apparatus.

15. The method according to claim 12, wherein the external apparatus and the device are connected via a power line, and wherein a process for disconnecting a connection between the power line and the second line is performed if an occurrence of the error in the first line is detected after the transmission of the EDID from the memory to the external apparatus via the first line is started and before the transmission of the EDID from the memory to the external apparatus via the first line ends.

16. The method according to claim 12, further comprising displaying a video signal if the video signal is received from the external apparatus after transmission of the EDID ends and before a predetermined time elapses.

17. The method according to claim 12, further comprising causing the device to perform a shutdown process if a video signal is not received from the external apparatus after transmission of the EDID ends and before a predetermined time elapses.

18. The method according to claim 12, further comprising causing the device to perform a shutdown process if a process for controlling a voltage supplied to the external apparatus via the second line is performed a predetermined number of times.

19. The method according to claim 12, wherein the device includes a projector.

20. The method according to claim 12, further comprising:

detecting whether or not an electrical potential relating to a power line exceeds a predetermined value, before the EDID is transmitted from the memory to the external apparatus via the first line, wherein the external apparatus and the device are connected via the power line; and initiating transmission of the EDID from the memory to the external apparatus via the first line if the electrical potential relating to the power line exceeds the predetermined value.

21. The method according to claim 12, wherein the first line corresponds to a display data channel (DDC) line, and the second line corresponds to a hot plug detect (HPD) line.

22. The method according to claim 12, wherein the device includes:

a display unit configured to display an image;

a light source configured to provide a light to the display unit; and a projecting lens configured to project an image.

23. A non-transitory computer-readable storage medium that stores a program for causing a computer to execute a method for a device, the method comprising:

transmitting extended display identification data (EDID) from a memory to an external apparatus via a first line, wherein the device includes the memory that stores the EDID;

detecting whether or not an error in the first line occurs after the transmission of the EDID from the memory to the external apparatus via the first line is started and before the transmission of the EDID from the memory to the external apparatus via the first line ends; and controlling a voltage supplied to the external apparatus via a second line if an occurrence of the error in the first line is detected after the transmission of the EDID from the memory to the external apparatus via the first line is started and before the transmission of the EDID from the memory to the external apparatus via the first line ends, so that the external apparatus can determine that the device is disconnected and then connected.

24. The non-transitory computer-readable storage medium according to claim 23, wherein the first line corresponds to a display data channel (DDC) line, and the second line corresponds to a hot plug detect (HPD) line.

25. The non-transitory computer-readable storage medium according to claim 23, wherein the device includes:

a display unit configured to display an image;

a light source configured to provide a light to the display unit; and a projecting lens configured to project an image.

* * * * *